United States Patent [19]

Shivers

[11] 4,029,576

[45] June 14, 1977

[54] SYSTEM FOR SOFTENING WATER

[75] Inventor: Ronald E. Shivers, Canton, Ohio

[73] Assignee: The Goodyear Tire & Rubber Company, Akron, Ohio

[22] Filed: Feb. 23, 1976

[21] Appl. No.: 660,303

[52] U.S. Cl. .................................. 210/27; 210/28; 210/38 A; 210/252; 210/266; 210/535

[51] Int. Cl.² .......................................... B01J 1/04

[58] Field of Search ............. 210/38 A, 28, 27, 25, 210/266, 263, 317, 284, 300, 519, 535, 534, 533, 532 R, 513, 290, 521, 195 R, 252, 254, 257 R

[56] References Cited

UNITED STATES PATENTS

| 2,748,077 | 5/1956 | Hodan et al. | 210/27 |
| 3,557,961 | 1/1971 | Stuart | 210/290 |
| 3,849,310 | 11/1974 | Condolios et al. | 210/534 |

Primary Examiner—Thomas G. Wyse
Assistant Examiner—Benoit Castel
Attorney, Agent, or Firm—F. W. Brunner; H. E. Hummer

[57] ABSTRACT

A system for reducing the hardness of raw water to a level where it is suitable for circulation to a boiler wherein the water is converted to steam for generating power and subsequent use in equipment for building tires. The system employs, (i) a sedimentation tank in which a mixture of raw water, lime and soda ash is heated to cause the precipitation of calcium carbonate from the water as a sludge; (ii) a filter with a bed of coal for removing sludge which escapes with the water removed from the sedimentation tank; (iii) a softener with a resinous bed of sodium zeolite resin for further reducing the hardness of the water to a desired or tolerable level; and (iiii) a special filter or trap between the coal filter and zeolite softener for removing particles of coal carried along by the water as it flows through the coal filter, since the particles of coal eventually destroy the capacity and effectiveness of the zeolite softener.

13 Claims, 2 Drawing Figures

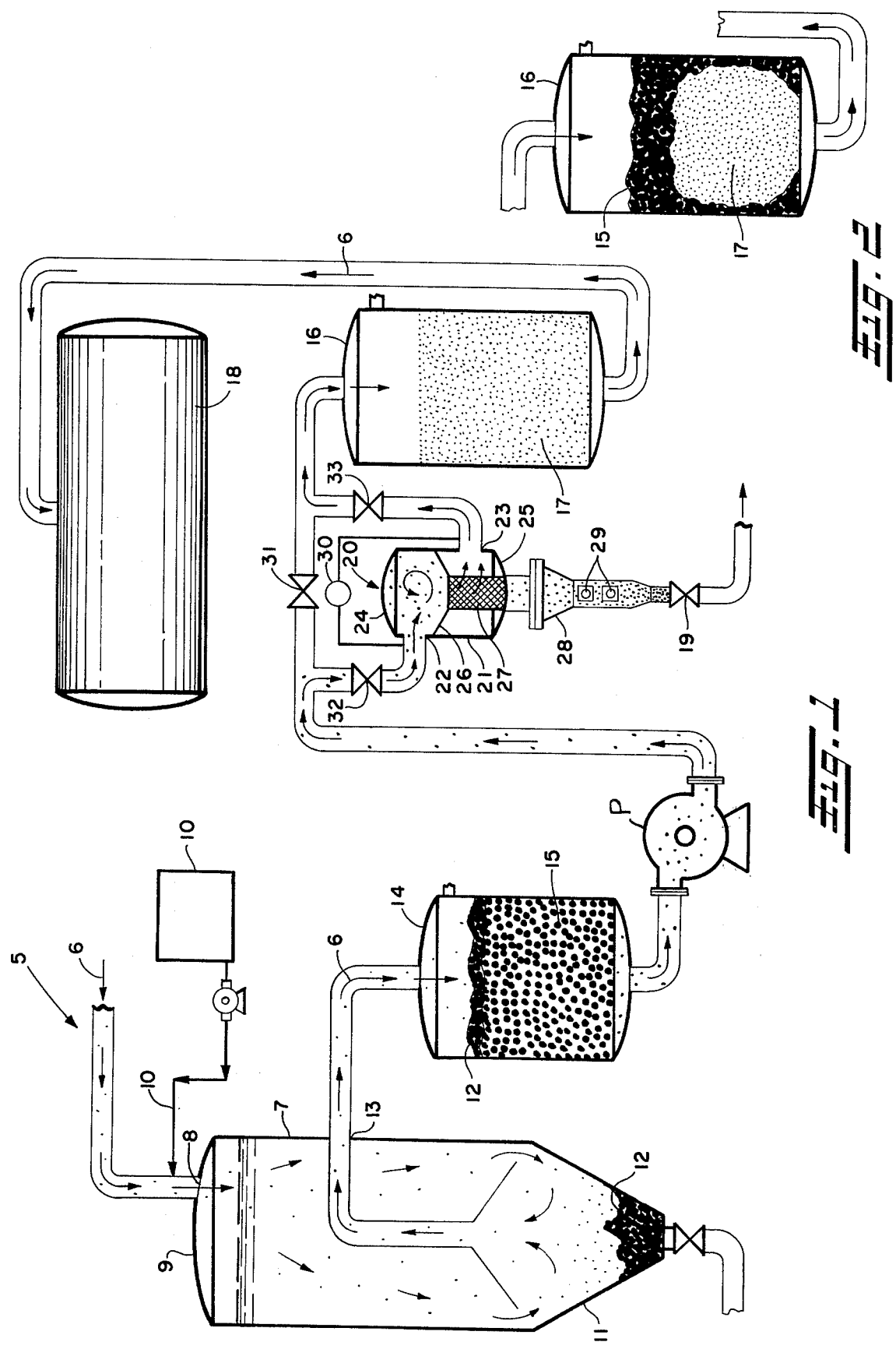

SYSTEM FOR SOFTENING WATER

BACKGROUND OF THE INVENTION

The invention is designed for use in a conventional hot lime-soda ash process with zeolite softeners utilized by many companies for softening water, i.e. reducing the total hardness of water, expressed generally in terms of calcium carbonate, which is the hardest salt of major concern, but including carbonates and other salts of water hardening materials such as magnesium, calcium and iron. The total hardness of the water is reduced by decreasing the parts per million (ppm) of calcium carbonate ($CaCO_3$) in the water. In such systems, the water is finally treated in a zeolite softener by filtering it through a bed of sodium zeolite resin. Prior to this final treatment, it is necessary to pass the water through a coal filter having a bed of anthracite coal. Unfortunately, particles of coal are carried by the water from the filter into the softener where they eventually clog and destroy the chemical ion exchange of the water with the sodium zeolite resin. A fouled up resinous bed of sodium zeolite must be removed and replaced. To do this is very time consuming and costly. The invention is directed to solving this problem by removing any particles of coal from the water, prior to the circulation of the water to the zeolite softener.

Briefly stated, the invention is in a system of treating water to reduce the hardness of the water by successively filtering the water through a bed of coal and a resinous bed of sodium zeolite. A coal trap is interposed between these two beds for removing any particles of coal from the water, prior to the circulation of the water to the resinous bed of sodium zeolite. Consequently, the resinous bed of sodium zeolite will be kept clean and not become clogged and contaminated with coal which destroys the capacity and effectiveness of the resinous bed of sodium zeolite in reducing the total hardness of the water.

DESCRIPTION OF THE DRAWING

The following description of the invention will be better understood by having reference to the annexed drawing, wherein:

FIG. 1 is a flow diagram of a system for treating water in accordance with the invention, showing the various components of the system in cross-section; and FIG. 2 is a cross-section of a zeolite softener fouled with coal.

BACKGROUND OF THE INVENTION

With reference to the drawing, there is shown a system 5 for treating raw water 6 from a tap or other source of supply (not shown) to reduce the total hardness of the raw water 6, i.e. soften the raw water 6 by reducing the parts per million of calcium carbonate and other hard salts in the water either by the elimination of the hard salts, or by replacing them with so-called soft salts. The raw water 6 is allowed to flow into a large, vertically disposed conventional sedimentation tank 7 through a fluid inlet 8 in the top 9 of the tank 7. A solution 10 of lime and soda ash is pumped into the stream of raw water 6 entering the fluid inlet 8 of the tank 7. The mixture of raw water 6 and solution 10 of lime and soda ash is heated by steam circulated within the tank 7 at a temperature of 220° F., or under a pressure of 5 pounds per square inch (psi) to cause a chemical reaction wherein the majority of calcium carbonate and other well known salts of, for example, magnesium and iron, are precipitated out of the mixture into the bottom 11 of the tank 8 as a sludge 12 which is periodically removed from the tank 7. The raw water 6 is removed from the tank 7 through a fluid outlet 13 in the side of the tank 7 and circulated to a coal filter 14 where the water 6 is allowed to filter through a bed of anthracite coal 15 for removing any sludge 12 carried by the water 6 from the tank 7. The sludge 12 congregates on the top of the bed of coal 15 and is conventionally backwashed from the coal filter 14.

The water 6, after passage through the coal filter 14 is circulated under pressure, by a conventional pump P to a softener 16 where the water 6 filters through a resinous bed of sodium zeolite 17 for further reducing the hardness of the water 6 by ion exchange. Unfortunately, particles of anthracite coal 15 are carried by the water 6 from the coal filter 14 into the zeolite softener 16 where they become dispersed in the resinous particles of sodium zeolite 17 and gradually surround and strangle the resinous bed of sodium zeolite 17, as best seen in FIG. 2, to destroy the capacity and effectiveness of the zeolite softener 16. Coal has a specific gravity close to that of the sodium zeolite. Consequently, the coal cannot be separated from sodium zeolite by conventional backwashing of the zeolite softener 16. The resinous bed of sodium zeolite 17 eventually becomes so fouled with coal 15 that the zeolite softener 16 has to be shut down and the contaminated resinous bed of sodium zeolite 17 removed and replaced with a new resinous bed of sodium zeolite 17.

Water 6 from the zeolite softener 16 is then circulated to a conventional storage tank 18 where the treated water 6 is held until it is needed for circulation to a boiler where the water is converted to steam for generating power and subsequent use in heating equipment employed in the molding and vulcanization of tires. It is desirable to remove as much calcium from the water 6 as possible, since a concentration of calcium in the water causes boiler scale which adversely affects operation of the boiler. Using the above-described water softening system 5, the hardness of the raw water 6 from the source of supply is, for example, reduced from 132 parts per million of calcium carbonate to a hardness level of 18 parts per million as the water leaves the coal filter 14, and further to a hardness level of approximately zero parts per million of calcium carbonate as the water leaves the zeolite softener 16. The foregoing water softening system 5 generally includes a number of coal filters 14 and zeolite softeners 16 and is very effective in reducing the hardness of the water to a level, such that the treated water will be sufficiently soft and not cause scale within the boiler.

THE INVENTION

A device 20 is interposed between the coal filter 14 and zeolite softener 16 to separate and remove any particles of coal 15 that have escaped from the coal filter 14, such that the water 6 circulated to the zeolite softener 16 will be essentially free of coal 15. The coal separator 20 comprises a vertically disposed, cylindrically shaped housing 21 having inlet and outlet ports 22 and 23 through which water 6 enters and exits the coal separator 20 adjacent the top 24 and bottom 25, respectively, of the cylindrical housing 21. The coal ladened water 6, upon entering the separator 20 is directed by a frusto-conically shaped, solid metal deflector 26 into a cylindrical cage 27 which is formed of wire screening having a mesh that is small enough to hold the particles of coal 15 within the cage 27 and prevent their escapement through the outlet port 23 into the zeolite softener 16. A cage 27 composed of 18 mesh screen of 0.017 inches diameter stainless steel wire was found suitable for trapping particles of anthracite coal 15 within the separator 20. The particles of coal 15 in the cage 27 fall, by gravity, into a vertically disposed catch basin or trap 28 which is bolted on the bottom 25 of the housing 21 in axial alignment with the cage 27. The coal trap 28 is provided with a pair of vertically spaced glass eyes 29 for looking into the catch basin 28 to determine the level of coal trapped therein. The inside of the catch basin 28 is lighted by any suitable lighting device for increasing observation of coal 15 trapped within the catch basin 28. The coal 15 is conventionally blown from the catch basin 28 through a blow-down valve 19 without interuption of the water softening system 5, when a sufficient amount of coal builds up within the catch basin 28.

A conventional electrical differential switch, or pressure differential guage 30 is used to monitor the pressure of the water 6 as it enters and exits the inlet and outlet ports 22 and 23 of the coal separator 20. The switch and pressure differential guage 30 are designed to trigger an audible alarm, when the pressure of the water 6, existing the housing 21, drops below a predetermined level, to notify an operator that the coal separator 20 is not functioning properly. In all probability, the cage 27 is clogged with coal 15 and needs cleaning. The operator immediately shuts down operation of the coal separator 20 by opening the by-pass valve 31 and closing the shut-off valves 32, 33 in the pipes leading to and from the housing 21 to cause the water 6 to flow directly from the coal filter 14 into the zeolite softener 16, until the malfunction of the coal separator 20 is corrected. The catch basin 28 is unbolted and taken from the housing 21 to permit removal of the cage 27 for cleaning, or replacement if necessary. The coal separator 20 is reactivated by opening the shut-off valves 32, 33 and closing the by-pass valve 31 to direct the flow of water 6 back through the coal separator 20 and place the water softening system 5 in normal operating condition.

Thus, there has been provided a highly effective filter or trap for removing particles of coal from water being circulated to a zeolite softener in which the water is finally treated for hardness. It has been found that the coal trap effectively removes particles of coal, such that water circulated to the zeolite softener is essentially free of coal which is detrimental to the continued successful operation of the zeolite softeners.

What is claimed is:

1. A system for reducing the total hardness of water expressed in parts per million of calcium carbonate, comprising:
    a. a sedimentation tank in which calcium carbonate is precipitated as sludge from water to be softened;
    b. a bed of coal for removing sludge carried from the tank by the water treated therein;
    c. means for circulating water from the tank to the bed of coal for filtration therethrough;
    d. a resinous bed of sodium zeolite, separate from the bed of coal, for further reducing the total hardness of water treated in the tank;
    e. means for circulating water, which has filtered through the circulating water, which has filtered through the bed of coal, to the resinous bed for filtration therethrough; and
    f. a separator interposed between the two beds for removing particles of coal carried from the bed of coal by water which has filtered through the bed of the coal, said separator comprising:
        1. a housing which is impervious to water and which has a top and bottom when disposed vertically;
        2. an inlet port through which coal-laden water enters the housing adjacent the top thereof;
        3. an outlet port through which coal-free water exits the housing adjacent the bottom thereof;
        4. a stationary cage disposed within the housing in spaced relation from the inlet and outlet ports, the cage having openings in the top and bottom thereof and formed of wire screen having a mesh sufficiently small to contain particles of coal within the cage; and
        5. means disposed within the housing for directing coal-laden water from the inlet port into the cage through the opening in the top thereof, and through the wire screen and into the space between the cage and outlet port for exit through the outlet port.

2. The system of claim 1, which includes:
    g. means for storing water that has filtered through the resinous bed of resin.

3. The system of claim 1, wherein the separator includes:
    6. a catch basin disposed below the cage for receiving and temporarily storing particles of coal falling, by gravity, from the cage through the opening in the bottom thereof;
    7. means of viewing particles of coal in the catch basin;
    8. means for flushing particles of coal from the catch basin without interrupting operation of the system; and
    9. means for monitoring the flow of water to and from the housing.

4. The system of claim 3, wherein the coal is anthracite coal.

5. The system of claim 1, wherein the means (e) for circulating water from the bed of coal to the resinous bed includes a pump.

6. A method of reducing the total hardness of water expressed in parts per million of calcium carbonate, comprising:
    a. reacting water with lime and soda ash in a sedimentation tank to precipitate calcium carbonate from the water, as sludge, thereby reducing the hardness of the water;
    b. then passing the water, with the reduced hardness, through a bed of coal for filtering out sludge carried by water from the sedimentation tank;
    c. then passing the water, filtered through the bed of coal, through a separator for removing particles of coal carried by water from the bed of coal, the separator comprising:
        1. a housing which is impervious to water and which has a top and bottom when disposed vertically;
        2. an inlet port through which coal-laden water enters the housing adjacent the top thereof;
        3. an outlet port through which coal-free water exits the housing adjacent the bottom thereof;

4. A stationary cage disposed within the housing in spaced relation from the inlet and outlet ports, the cage having an opening and formed of wire screen having a mesh sufficiently small to contain particles of coal within the cage; and 5. means disposed within the housing for directing coal-laden water from the inlet port into the cage through the opening and through the wire screen and into the space between the cage and outlet port for exit through the outlet port; and d. then passing the water, from the separator, through a resinous bed of sodium zeolite to further reduce the total hardness of the water.

7. The method of claim 6, wherein the coal is anthracite coal.

8. The method of claim 6, wherein the water is passed, under pressure, from the bed of coal.

9. The method of claim 8, which includes monitoring the flow of water through the separator.

10. The method of claim 9, which includes triggering an audible alarm when the pressure of the water exiting the separator falls below a predetermined level.

11. The method of claim 10, which includes bypassing the water around the coal separator when the audible alarm is sounded.

12. A separator for removing particles of coal from coal-laden water, comprising:

a. a housing which is impervious to water and which has a top and bottom when disposed vertically;

b. an inlet port through which coal-laden water enters the housing adjacent the top thereof;

c. an outlet port through which coal-free water exits the housing adjacent the bottom thereof;

d. a stationary cage disposed within the housing in spaced relation from the inlet and outlet ports, the cage having openings in the top and bottom thereof and formed of wire screen having a mesh sufficiently small to contain particles of coal within the cage;

e. means disposed within the housing for directing coal-laden water from the inlet port into the cage through the opening in the top thereof, and through the wire screen and into the space between the cage and outlet port for exit through the outlet port;

f. a catch basin disposed below the cage for receiving and temporarily storing particles of coal falling, by gravity, from the cage through the opening in the bottom thereof; and g. means for flushing particles of coal from the catch basin.

13. The separator of claim 12, which includes means for viewing particles of coal within the catch basin.

* * * * *

UNITED STATES PATENT OFFICE
CERTIFICATE OF CORRECTION

PATENT NO. : 4,029,576
DATED : June 14, 1977
INVENTOR(S) : Ronald E Shivers

It is certified that error appears in the above-identified patent and that said Letters Patent are hereby corrected as shown below:

Column 3, line 27, "existing" should be -- exiting --.

Claim 1, line 14, cancel "through the circulating water, which has filtered".

Signed and Sealed this

Fourth Day of October 1977

[SEAL]

Attest:

RUTH C. MASON
Attesting Officer

LUTRELLE F. PARKER
Acting Commissioner of Patents and Trademarks